United States Patent
Han

(10) Patent No.: US 7,062,148 B1
(45) Date of Patent: Jun. 13, 2006

(54) APPARATUS AND METHOD OF CONTROLLING PLAYBACK ACCORDING TO PROGRAM RATINGS

(75) Inventor: Jong-hee Han, Suwon (KR)

(73) Assignee: Samsung Electronics Co., Ltd., Kyungki-do (KR)

(*) Notice: Subject to any disclaimer, the term of this patent is extended or adjusted under 35 U.S.C. 154(b) by 522 days.

(21) Appl. No.: 09/440,639

(22) Filed: Nov. 16, 1999

(30) Foreign Application Priority Data

Nov. 19, 1998 (KR) .............................. 1998-49772

(51) Int. Cl.
*H04N 5/91* (2006.01)

(52) U.S. Cl. .......................... 386/68; 386/69; 360/73.2

(58) Field of Classification Search .................... 386/1, 386/46, 68–70, 83, 69; 360/71, 72.1, 72.2, 360/72.3, 73.01, 73.04, 73.05, 73.08
See application file for complete search history.

(56) References Cited

U.S. PATENT DOCUMENTS 5,519,549 A * 5/1996 Choi ............................ 360/71
5,585,932 A * 12/1996 Kim ............................. 386/69
6,091,884 A * 7/2000 Yuen et al. ................... 386/83
6,408,128 B1* 6/2002 Abecassis ..................... 386/68
6,553,178 B1* 4/2003 Abecassis ..................... 386/83

* cited by examiner

*Primary Examiner*—James J. Groody
*Assistant Examiner*—Christopher Onuaku
(74) *Attorney, Agent, or Firm*—Sughrue Mion, PLLC

(57) ABSTRACT

An apparatus and method of recording and reproducing a video/audio signal is provided, and more particularly, an apparatus and method of controlling playback according to program ratings, by which a playback mode is controlled on the basis of a set viewable program rating, upon playback of programs recorded together with information associated with the program ratings. Upon playback of a tape in which various rating programs are recorded, when the rating of a program to be played back is higher than a set program rating, the position of a program having the set program rating or lower ratings is searched for at high speed. Thus, a viewable program is automatically searched for within a short time without key manipulation, and can be viewed by viewers.

5 Claims, 2 Drawing Sheets

APPARATUS AND METHOD OF CONTROLLING PLAYBACK ACCORDING TO PROGRAM RATINGS

BACKGROUND OF THE INVENTION

1. Field of the Invention

The present invention relates to an apparatus and method of recording and reproducing video/audio, and more particularly, to an apparatus and method of controlling playback according to program ratings, by which a playback mode is controlled on the basis of a viewable program grade set by a user, upon playback of programs recorded together with information associated with the program ratings.

2. Description of the Related Art

In the prior art, a broadcasting station transmits video and audio signals related to a broadcast program, and the television of a user receives and modulates video and audio signals and outputs the video signal to the monitor and outputs the audio signal to the speaker. These are the entire functions of a conventional television.

However, as the function of the television becomes diversified, the broadcasting station, which basically transmits and receives video and audio signals, transmits the video and audio signals with additional information. For example, the broadcasting station may insert information related to a television program into a specific area for a video signal which is not shown on the monitor, and transmits signals with the information recorded as described above, and a receiving side extracts this program information added to a video signal, and utilizes it during setting of programmed recording. Therefore, the programmed recording is easily set. Also, viewers can easily search for and watch a desired program while checking the program broadcasting sequence of each broadcasting station.

As the function of the television becomes further diversified, the broadcasting station classifies broadcasting programs as well as broadcasting program information, by ratings, into programs that can be viewed only by adults, and programs that all family members can view together. The broadcasting station has been developed so as to transmit broadcasting program information together with information associated with viewable program ratings.

Then, the receiving side extracts data associated with the grade of a received program from the broadcasting program information, and normally outputs a video signal and an audio signal if the grade of the received program is lower than the grade of the viewable program set by a user, and prevents output of video and audio signals if the grade of the received program is higher than the set viewable program.

Also, in the case that a video signal to which information associated with the program ratings is recorded by a recording device such as VCR, and then reproduced, data concerning the grade of a received program is extracted, and a video signal and an audio signal are normally output if the grade pertains to a group of viewable programs. Otherwise, the signals are controlled to be not output.

Generally, several types of programs are recorded on one VCR tape and viewed by users. However, in the case that several types of programs have different program ratings, even if a currently-reproduced program belongs to a group of programs, that cannot be viewed by all family members, because its rating is higher than the rating of the set viewable program, the VCR plays the tape in a normal playback mode to make viewers wait until the next viewable recorded program is played back. Alternatively, the viewers must manually convert the play mode into a high-speed search mode to search for the next recorded program. As described above, the conventional television has problems in use.

SUMMARY OF THE INVENTION

To solve the above problems, it is an objective of the present invention to provide an apparatus and method of controlling playback according to program ratings, by which a recorded program of a viewable grade is searched for at high speed and played back when a currently-reproduced recorded program belongs to a nonviewable program grade.

Accordingly, to achieve the above objective, the present invention provides an apparatus for controlling playback according to program ratings, in a video/audio recording/playback controlling apparatus for reproducing signals from a recording medium in which a video signal having program rating data is recorded. The apparatus includes: a data slicer for extracting only the program rating data from the video signal in a general playback mode; a decoder for decoding the program rating data output by the data slicer; a controller for generating a first control signal for blocking a video/audio signal if a viewable program rating set by a user is lower than the rating of the decoded program data, or generating a second control signal if a video index search system (VISS) signal is detected; and a tape speed controller for executing a high-speed search mode when the first control signal is received, or executing the general playback mode when the second control signal is received.

To achieve the above objective, the present invention provides a method of controlling playback according to program ratings, in a video/audio recording/playback controlling method of reproducing signals from a recording medium in which a video signal having program rating data is recorded. The method includes the steps of: (a) extracting program rating data from the video signal reproduced from the recording medium; (b) comparing a viewable program rating set by a user with the rating of decoded program data extracted in step (a); (c) stopping output of a video/audio signal and executing a high-speed search mode, if the set viewable program rating is lower than the rating of the extracted program rating data, otherwise, executing a normal playback mode; (d) determining whether a new recorded program has been reached, while the high-speed search mode is being executed; and (e) converting the high-speed search mode into the normal playback mode if a new recorded program has been reached, and then repeating the steps (a) through (d).

BRIEF DESCRIPTION OF THE DRAWINGS

The above objective and advantage of the present invention will become more apparent by describing in detail a preferred embodiment thereof with reference to the attached drawings in which.

DESCRIPTION OF THE PREFERRED EMBODIMENT

Figure 1:
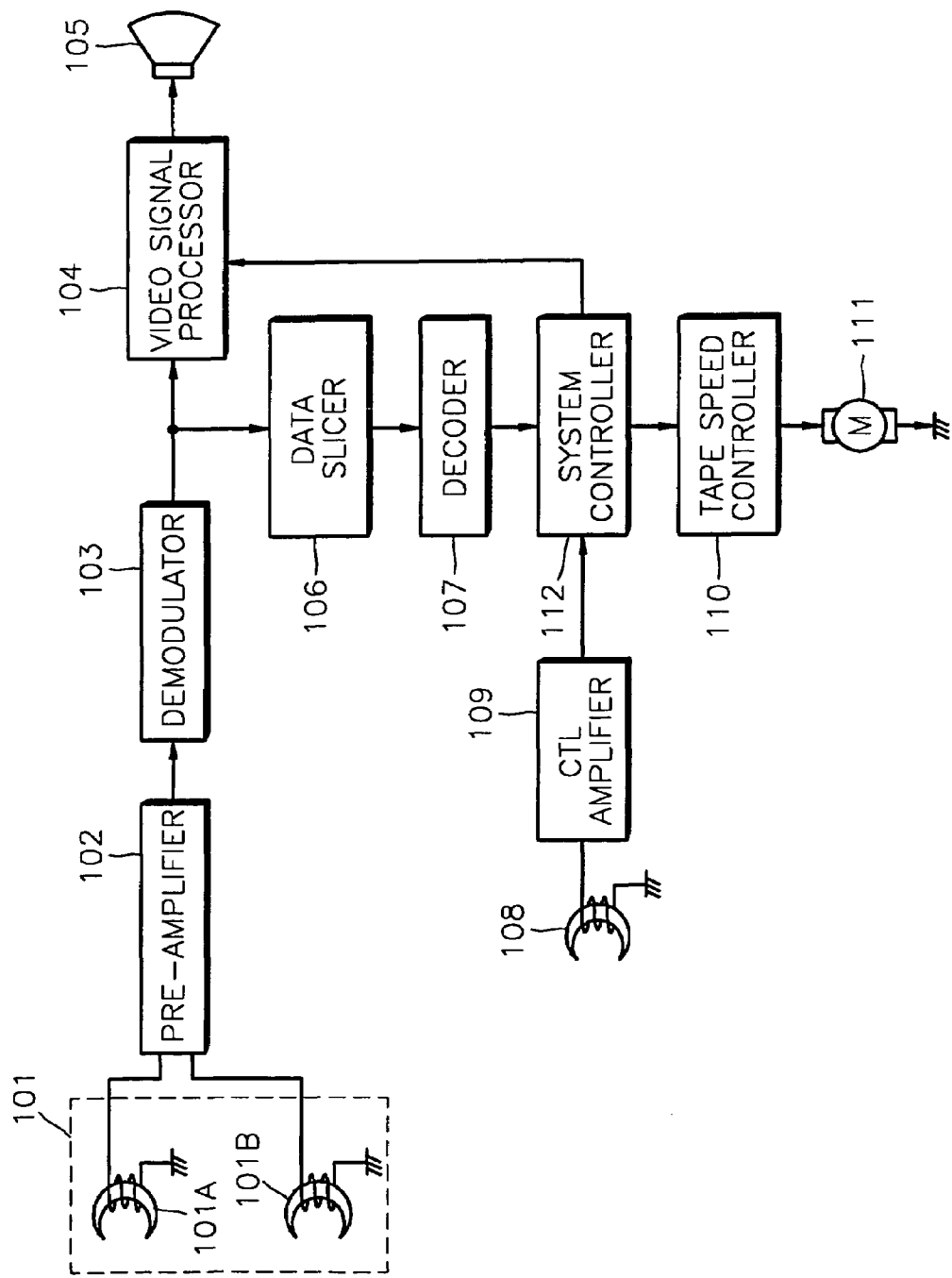
FIG. 1 is a block diagram of an apparatus for controlling playback according to program ratings, according to the present invention.

Referring to FIG. 1, an apparatus for controlling playback according to program ratings, according to the present invention, includes a video head 101, a pre-amplifier 102, a demodulator 103, a video signal processor 104, a cathode ray tube (CRT) 105, a data slicer 106, a decoder 107, a control head 108, a control amplifier 109, a tape speed controller 110, a capstan motor 111, and a system controller 112.

Figure 2:
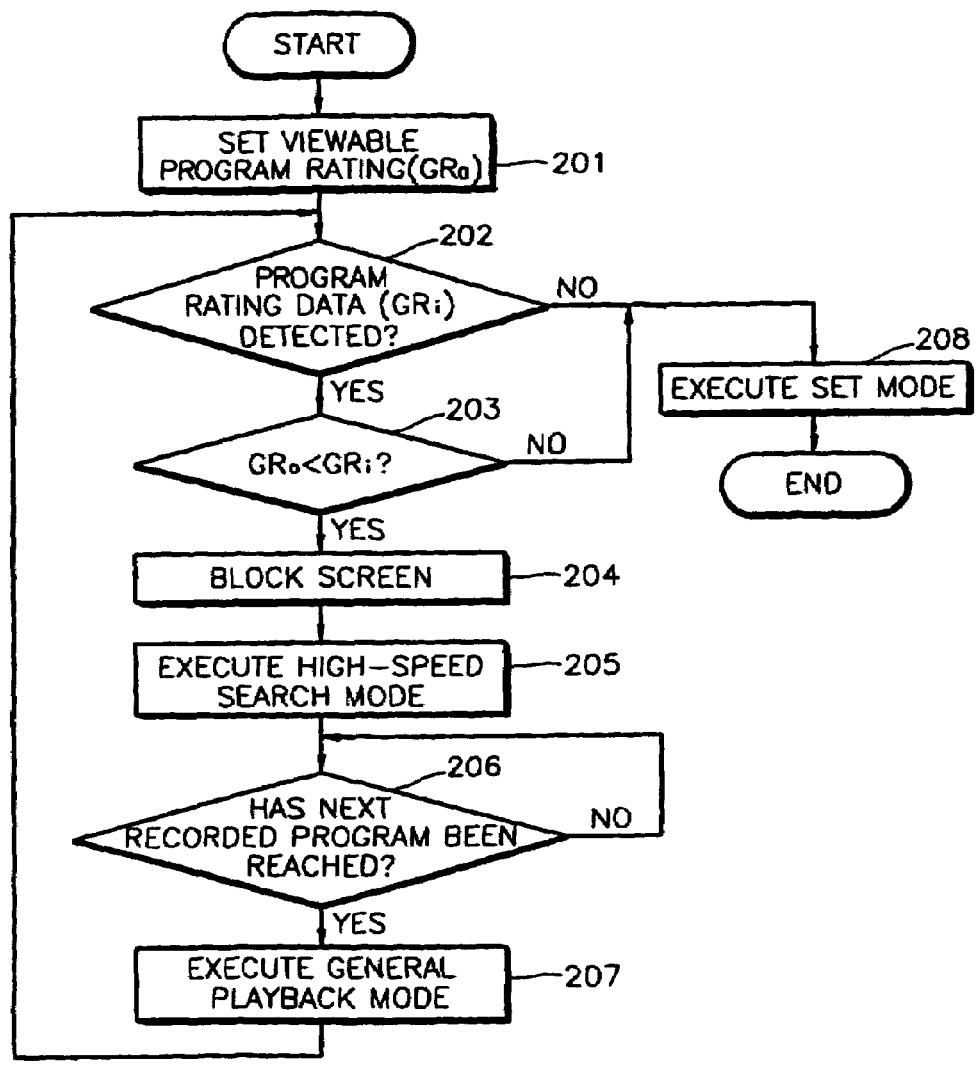
FIG. 2 is a flowchart illustrating a method of controlling playback according to program ratings, according to the present invention.

FIG. 2 shows a method of controlling playback according to program ratings, according to the present invention. The steps of the method shown in FIG. 2 will now be described with reference to the configuration diagram shown in FIG. 1.

In step 201, a user sets a viewable program rating ($GR_0$) among the ratings of programs to be reproduced, using a key input unit (not shown), through the system controller 112. For example, program ratings can be classified in order of ALL to G to PG to PG-13 to R to NC-17 to X to NR. Here, ALL denotes a program of the lowest rating that can be viewed by all classes and ages of viewers, and NR denotes the highest program rating that can be viewed by only adults.

Thus, when the user intends to output only received programs of PG-13 or lower ratings among the program ratings through the CRT 105 and a speaker, the system controller 112 sets the rating PG-13 as a viewable program rating using the key input unit.

In step 202, a determination is made as to whether program rating data has been attached to a video signal to be reproduced. If the program rating data ($GR_1$) exists, it is detected.

To be more specific, a video signal recorded in a tape by the video head 101 is reproduced, and the reproduced video signal is amplified by the pre-amplifier 102, and the amplified reproduced video is output to the demodulator 103. Then, the reproduced modulated video signal is demodulated by the demodulator 103, and output to the video signal processor 104 and the data slicer 106. Only program rating data ($G_i$) added to a specific portion of the demodulated video signal is separated and extracted by the data slicer 106, and the separated program rating data ($G_i$) is decoded by the decoder 107.

In step 203, the program rating ($GR_0$) set in step 201 is compared with the rating of the program rating data ($GR_i$) detected in step 202.

In step 208, when no program rating data is detected from the reproduced video signal, or when it is determined in step 203 that the set program rating is equal to or higher than the detected rating, this indicates that a viewable program is being played back. Accordingly, a current general playback mode is normally executed without limit in video/audio output.

In step 204, a determination in step 203 that the set program rating is lower than the rating detected from the reproduced video signal, indicates that a nonviewable program is being played back, and accordingly, the system controller 112 outputs an image control signal for controlling a video signal processed by the video signal processor 104 to be prevented from being output to the CRT 105.

In step 205, with the output screen blocking in step 204, the system controller 112 generates a command for converting the execution mode of a VCR from the general playback mode to the high-speed search mode. Accordingly, the tape speed controller 110 plays a tape at high speed by applying an increased voltage to the capstan motor 111 according to the high-speed search command.

In step 206, the controller 112 determines whether the next recorded program is displayed during execution of the high-speed search mode. To be more specific, the duty cycle of the control signal of the control amplifier 109 which has been output from the control head 108 and amplified by the control amplifier 109, is determined. When a control signal corresponding to the duty cycle of a video index search system (VISS) signal is detected, it is determined that the next program has been reached.

In step 207, if the next recorded program has been reached during execution of the high-speed search mode, the high-speed search mode is converted into the general playback mode, and the steps 202 through 206 are repeated.

According to the present invention as described above, upon playback of a tape in which various rating programs are recorded, when the rating of a program to be played back is higher than a set program rating, the position of a program having the set program rating or lower ratings is searched for at high speed. Thus, a viewable program is automatically searched for within a short time without key manipulation, and can be viewed by viewers.

What is claimed is:

1. An apparatus for controlling playback according to program ratings, in a video/audio recording/playback controlling apparatus for reproducing signals from a recording medium in which a video signal having program rating data is recorded, the apparatus comprising:

a decoder for decoding the program rating data to generate decoded program rating data;

a controller for generating a first control signal for blocking a video/audio signal if a viewable program rating set by a user is lower than the rating of the decoded program rating data, and for generating a second control signal if a signal indicating a new program is detected; and a tape speed controller for executing a high-speed search mode when the controller generates the first control signal, and for executing the general playback mode when the controller generates the second control signal.

2. The apparatus of claim 1, further including:

a data slicer for extracting only the program rating data from the video signal in a general playback mode and outputting the program rating data to the decoder.

3. The apparatus of claim 1, wherein the signal indicating the new program is a video index search system (VISS) signal.

4. A method of controlling playback according to program ratings, in a video/audio recording/playback controlling method of reproducing signals from a recording medium in which a video signal having program rating data is recorded, the method comprising the steps of:

(a) extracting program rating data from the video signal reproduced from the recording medium;

(b) comparing a viewable program rating set by a user with the rating of decoded program data extracted in step (a);

(c) stopping output of a video/audio signal and controlling a tape speed controller to execute a high-speed search mode, if the set viewable program rating is lower than the rating of the extracted program rating data, otherwise, executing a normal playback mode;

(d) determining whether a new recorded program has been reached, while the high-speed search mode is being executed; and (e) converting the high-speed search mode into the normal playback mode if a new recorded program has been reached, and then repeating the steps (a) through (d).

5. The method of claim 4, wherein the determination in step (d) whether the new recorded program has been reached is made by a determination of whether a video index search system (VISS) signal is detected, made using the duty cycle of a control signal.

* * * * *